United States Patent [19]
Sorkin

[11] Patent Number: 6,040,546
[45] Date of Patent: Mar. 21, 2000

[54] METHOD AND APPARATUS FOR CUTTING A TENDON USED IN A POST-TENSION ANCHOR SYSTEM

[76] Inventor: Felix L. Sorkin, 4115 Greenbriar Dr., P.O. Box 1503, Stafford, Tex. 77477

[21] Appl. No.: 09/317,097

[22] Filed: May 23, 1999

[51] Int. Cl.$^7$ ................................................. B23K 9/00
[52] U.S. Cl. ............................... 219/121.39; 219/121.67
[58] Field of Search .................... 219/121.39, 121.44, 219/121.59, 121.58, 121.67, 121.48, 121.36; 52/230, 233; 78/15; 72/407; 83/745; 228/25; 30/372

[56] References Cited

U.S. PATENT DOCUMENTS

| | | | |
|---|---|---|---|
| 3,913,820 | 10/1975 | Valentine | 228/25 |
| 4,349,182 | 9/1982 | Blackburn | 266/57 |
| 4,558,584 | 12/1985 | Myers | 72/407 |
| 4,806,726 | 2/1989 | Rosa et al. | 219/121.67 |
| 4,896,470 | 1/1990 | Sorkin . | |
| 5,072,558 | 12/1991 | Sorkin et al. . | |
| 5,093,997 | 3/1992 | Gilman | 30/372 |
| 5,436,425 | 7/1995 | Sorkin . | |

*Primary Examiner*—Teresa Walberg
*Assistant Examiner*—Quang Van
*Attorney, Agent, or Firm*—Harrison & Egbert

[57] ABSTRACT

An apparatus for attachment to a cutting torch used for the severing of a tendon in a post-tension anchor system. The apparatus includes a first shield having an opening formed therein and adapted to allow the tendon to pass therethrough, a tubular extension extending outwardly of the first shield at the opening, and a bracket member affixed to the first shield and adapted to attach the cutting torch such that the cutting torch resides on a side of the first shield. The tubular extension has an interior adapted to extend around the tendon on the opposite side of the first shield. A second shield is connected to the bracket member. This second shield has an opening adapted to allow the tendon to extend therethrough. The second shield is arranged in spaced parallel relationship to the first shield. The cutting torch has a nozzle which is interposed between the first shield and the second shield.

19 Claims, 4 Drawing Sheets

METHOD AND APPARATUS FOR CUTTING A TENDON USED IN A POST-TENSION ANCHOR SYSTEM

FIELD OF THE INVENTION

The present invention relates to a method and apparatus for cutting tendons, especially post-tensioned tendons used in concrete structures, utilizing an acetylene torch or a cutting torch.

BACKGROUND OF THE INVENTION

For many years, the design of concrete structures imitated the typical steel design of column, girder and beam. With technological advances in structural concrete, however, its own form began to evolve. Concrete has the advantages of lower cost than steel, of not requiring fireproofing, and of its plasticity, a quality that lends itself to free flowing or boldly massive architectural concepts. On the other hand, structural concrete, though quite capable of carrying almost any compressive load, is extremely weak in carrying significant tensile loads. It becomes necessary, therefore, to add steel bars, called reinforcements, to concrete, thus allowing the concrete to carry the compressive forces and the steel to carry the tensile forces.

Structures of reinforced concrete may be constructed with load-bearing walls, but this method does not use the full potentialities of the concrete. The skeleton frame, in which the floors and roofs rest directly on exterior and interior reinforced-concrete columns, has proven to be most economic and popular. Reinforced concrete framing is seemingly a quite simple form of construction. First, wood or steel forms are constructed in the sizes, positions, and shapes called for by engineering and design requirements. The steel reinforcing is then placed and held in position by wires at its intersections. Devices known as chairs and spacers are used to keep the reinforcing bars apart and raised off the form work. The size and number of the steel bars depends completely upon the imposed loads and the need to transfer these loads evenly throughout the building and down to the foundation. After the reinforcing is set in place, the concrete, a mixture of water, cement, sand, and stone or aggregate, of proportions calculated to produce the required strength, is placed, care being taken to prevent voids or honeycombs.

One of the simplest designs in concrete frames is the beam-and-slab. This system follows ordinary steel design that uses concrete beams that are cast integrally with the floor slabs. The beam-and-slab system is often used in apartment buildings and other structures where the beams are not visually objectionable and can be hidden. The reinforcement is simple and the forms for casting can be utilized over and over for the same shape. The system, therefore, produces an economically viable structure. With the development of flat-slab construction, exposed beams can be eliminated. In this system, reinforcing bars are projected at right angles and in two directions from every column supporting flat slabs spanning twelve or fifteen feet in both directions.

Reinforced concrete reaches its highest potentialities when it is used in pre-stressed or post-tensioned members. Spans as great as one hundred feet can be attained in members as deep as three feet for roof loads. The basic principle is simple. In pre-stressing, reinforcing rods of high tensile strength wires are stretched to a certain determined limit and then high-strength concrete is placed around them. When the concrete has set, it holds the steel in a tight grip, preventing slippage or sagging. Post-tensioning follows the same principle, but the reinforcing tendon, usually a steel tendon, is held loosely in place while the concrete is placed around it. The reinforcing tendon is then stretched by hydraulic jacks and securely anchored into place. Pre-stressing is done with individual members in the shop and post-tensioning as part of the structure on the site.

In a typical tendon tensioning anchor assembly in such post-tensioning operations, there are provided anchors for anchoring the ends of the tendons suspended therebetween. In the course of installing the tendon tensioning anchor assembly in a concrete structure, a hydraulic jack or the like is releasably attached to one of the exposed ends of the tendon for applying a predetermined amount of tension to the tendon. When the desired amount of tension is applied to the tendon, wedges, threaded nuts, or the like, are used to capture the tendon and, as the jack is removed from the tendon, to prevent its relaxation and hold it in its stressed condition.

Metallic components within concrete structures may become exposed to many corrosive elements, such as de-icing chemicals, sea water, brackish water, or spray from these sources, as well as salt water. If this occurs, and the exposed portions of the tendon or anchor suffer corrosion, then they may become weakened due to this corrosion. The deterioration of the anchor or tendon can cause the tendons to slip, thereby losing the compressive effects on the structure, or the anchor can fracture. In addition, the large volume of by-products from the corrosive reaction is often sufficient to fracture the surrounding structure. These elements and problems can be sufficient so as to cause a premature failure of the post-tensioning system and a deterioration of the structure.

Several U.S. patents have considered the problem of anchor and tendon corrosion. For example, U.S. Pat. Nos. 4,896,470 and 5,072,558 disclose tendon tensioning anchor systems in which the metal anchor for the system is encapsulated in plastic and has a tubular portion extending outwardly towards the surface of the post-tensioned concrete body. A sealing cap is fitted to the end of the tubular portion of the plastic encapsulation to provide a fluid tight seal for protecting the post-tensioned tendon, anchor and tensioning wedges from exposure to the elements. Other prior art systems also exist in which the end of the post-tensioned tendon is severed at a point inwardly from the outer surface of the post-tensioned concrete body and means are used to protect the tendon end, anchor and tensioning wedges from exposure to the elements.

When using prior art systems for corrosion protection of the tensioning tendon and related apparatus, it is important that the tendon be terminated at a point inboard from the outside surface of the post-tensioned concrete body. This requires that the end of the tendon be cut just outboard of the tensioning wedges and within the pocket or cavity formed by the pocket former. The most common method used in the prior art for the cutting of such tensioned tendon at this point is an acetylene torch or cutting torch. Normally, the end of the cutting torch is placed in close proximity to the face of the anchor and within the pocket. Heat is applied directly to the tendon so as to sever the tension from that portion received within the anchor. Unfortunately, the cutting of the tension with a torch at the point near the tensioning wedges can cause the tendon and wedges to become heated and can result in the loss of temper of the metal or loosening of the post-tension wedges. Alternatively, the torch is not brought into close enough proximity to the anchor such that an improper cutting of the tension occurs. In other words, the tension may be cut so that an end of the tendon extends outwardly of the pocket and outwardly of the concrete body. No techniques have been used in the past for placing such a torch in close proximity to the anchor body within the pocket without causing the torch to adversely affect the post-tensioning wedges or the integrity of the anchor.

Another technique used for the cutting of the tendon is a conventional electric saw. However, this requires that a portion of the slab or other concrete structure surrounding the anchor also be cut in order to reach the portion of the tendon which is within the pocket formed in the concrete adjacent to the anchor.

Importantly, U.S. Pat. No. 5,436,425, issued on Jul. 25, 1995 to the present inventor described a system whereby the tendon could be properly cut by using a plasma cutting torch. This method and apparatus utilized a positioning element for interconnecting the head of a plasma cutting torch with the tendon to be severed. A positioning element conforms in shape to the pocket in the concrete body adjacent to the anchor. As such, the positioning element can be placed over the tendon and pushed into the pocket prior to activating the plasma cutting torch for the purposes of severing the tendon. The plasma cutting torch utilizes an air compressor, an electrical power source and electrodes to generate a stream of air, nitrogen or other gaseous plasma at very high temperatures of about 3000° C.–5000° C. or more. The stream of superheated gaseous plasma cuts through the metal more quickly than in an acetylene torch. The positioning element included a combination clamp and shield member which is releasably engagable with the tendon. The clamp included an attachment means or bracket which is engagable with the cutting head of the plasma torch. The attachment bracket is appropriately sized so as to be friction fitted around the cutting head or could be permanently attached to the cutting head. The positioning element is attached to a bracket and is releasably engagable with the tendon to be cut for positioning the cutting tip a predetermined distance from the longitudinal axis of the tendon. The positioning element includes a pair of depending jaws pivotally attached to a mounting bracket and biased towards a closed position by a spring. Each of the jaws has a semi-circular relieved portion at its inner edge which, when together, provides a circular opening through which the tendon may be received. Once the tendon is received in the center opening, the jaws close upon it.

Unfortunately, in this prior art patented device, it was found that typical construction environments do not utilize plasma cutting torches. These plasma cutting torches are very expensive and are typically not operated in a proper manner by the construction workers. As such, strong resistance to the use of such a plasma cutting torch has occurred. Conventionally, construction workers continue to utilize acetylene torches for the severing of the tendon.

Another problem associated with the use of torches for the cutting of tendons associated with plastic-encapsulated anchors used in a post-tension anchor system is that the cutting torch can impart heat to the tendon to such a sufficient degree as to cause a melting of the encapsulation. Since it is important to maintain the post-tension anchor system in an encapsulated condition, all of the plastic components of such an encapsulated system must be properly maintained. If, for example, the cap-receiving portion of the encapsulated anchor should become deformed or melted by heat, it would be impossible to attach the necessary cap or sealing devices so as to assure that the post-tension system is properly sealed. As such, it is important to be able to avoid the melting of the plastic encapsulations.

After use, it was discovered that the product associated with U.S. Pat. No. 5,436,425 effectively shielded the anchor from the heat imparted by the cutting torch. As such, it prevented the deterioration in the structural integrity of the tendon or the securing wedges. Unfortunately, it was found that under such heated conditions, the grease associated with the encapsulated tendon could become ignited and create a flame which would migrate along the tendon into the area of the plastic encapsulation. As such, a need developed so as to prevent this migration of such heat and flames from entering the area of the plastic encapsulation.

In certain countries, the use of cutting torches for the severing of the tendon is prohibited because of the fire risk associated with the use of such cutting torches. Since construction sites often contain many flammable materials or combustible materials, the use of such acetylene torches can create a fire hazard. As such, a need developed so as to prevent any sparks from exiting the cutting area. When the cutting torch is inserted into the pocket associated with the anchor of the post-tension anchor system, sparks will fly from the pocket as the tendon is severed. It is important to be able to contain such sparks and to prevent such sparks from possibly creating a fire hazard at the construction site.

It is, therefore, the primary object of the present invention to provide a method and apparatus for severing the free end of a post-tensioned tendon at a point near the tensioning wedges and within the depth of the pocket formed for the anchor member.

Another object is to provide such a method and apparatus in which the tendon is cut without substantially heating the tendon and tensioning wedges.

A still further object is to provide such a method and apparatus in which the tendon can be cut at the desired location without damaging the post-tensioned concrete body.

It is an object of the present invention to provide a method and apparatus in which the tendon can be cut by using a conventional acetylene torch.

It is another object of the present invention to provide an apparatus which prevents the migration of heat and flames to the encapsulation associated with an anchor body.

It is another object of the present invention to provide a method and apparatus which prevents sparks from flying from the pocket formed in the cavity associated with the construction anchor.

It is still object of the present invention to provide a cutting torch which is easy to use, relatively inexpensive, and simple to manufacture.

These and other objects and advantages of the present invention will become apparent from a reading of the attached specification and appended claims.

SUMMARY OF THE INVENTION

The present invention is an apparatus for attachment to a cutting torch used for the severing of a tendon used in a post-tension anchor system. The apparatus comprises a first shield having an opening formed therein so as to allow the tendon to pass therethrough, a tubular extension extending outwardly of one side of the first shield at the opening and adapted so as to extend around the tendon on such side of the first shield, and a bracket member affixed to the first shield and adapted to attach to the cutting torch such that the cutting torch resides on an opposite side of the first shield. A second shield is connected to the bracket member and has an opening adapted to allow the tendon to extend therethrough. The second shield is arranged in spaced parallel relationship to the first shield on the opposite side of the first shield from the tubular extension. The bracket member serves to position the second shield on a side of the cutting torch opposite the first shield.

The first shield comprises a first section and a second section pivotally connected to the first section. The opening is formed in both of the first and second sections. The first section has an inner edge having a semi-circular indentation formed therein. The second section has an inner edge with a semi-circular indentation formed therein. The semi-circular indentations define the opening in the first shield. The first section is movable with respect to the second section between a first position and a second position. In the first position, the first shield has the inner edges spaced from each other by a distance suitable for allowing the tendon to pass therethrough and into the area of the semi-circular indentations. In the second position, the first shield has the inner edge juxtaposed together such that the semi-circular indentations form a circular opening and extend around the tendon.

The tubular extension comprises a first semi-tubular section extending outwardly from the semi-circular indentation of the first section and a second tubular section extending outwardly from the semi-circular indentation of the second section. As such, the semi-tubular sections can open and close with the opening and closing of the first shield so as to enclose the tendon therein. The first and second sections are movable with respect to each other by action of gravity.

The second shield comprises a first section and a second section pivotally connected to the first section. The opening is formed in both of the first and second sections. The first section has an inner edge with a semi-circular indentation formed therein. The second section has an inner edge with a semi-circular indentation formed therein. The semi-circular indentations define the opening in the second shield. The first section is movable with respect to the second section between a first position and a second position. In the first position, the second shield has the inner edges spaced from each other by a distance suitable for allowing the tendon to pass therethrough and into the semi-circular indentations. In the second position, the second shield has the inner edges juxtaposed together such that the semi-circular indentations form the circular opening.

In actual use, the first shield will extend into the pocket formed in the concrete by a desired distance spaced from the end of the anchor. The tubular extension will extend between the anchor and the first shield. The second shield is positioned so as to be adjacent to the opening of the pocket. As such, the second shield will prevent sparks from flying from the pocket during the severing of the tendon.

DETAILED DESCRIPTION OF THE PRESENT INVENTION

Figure 1:
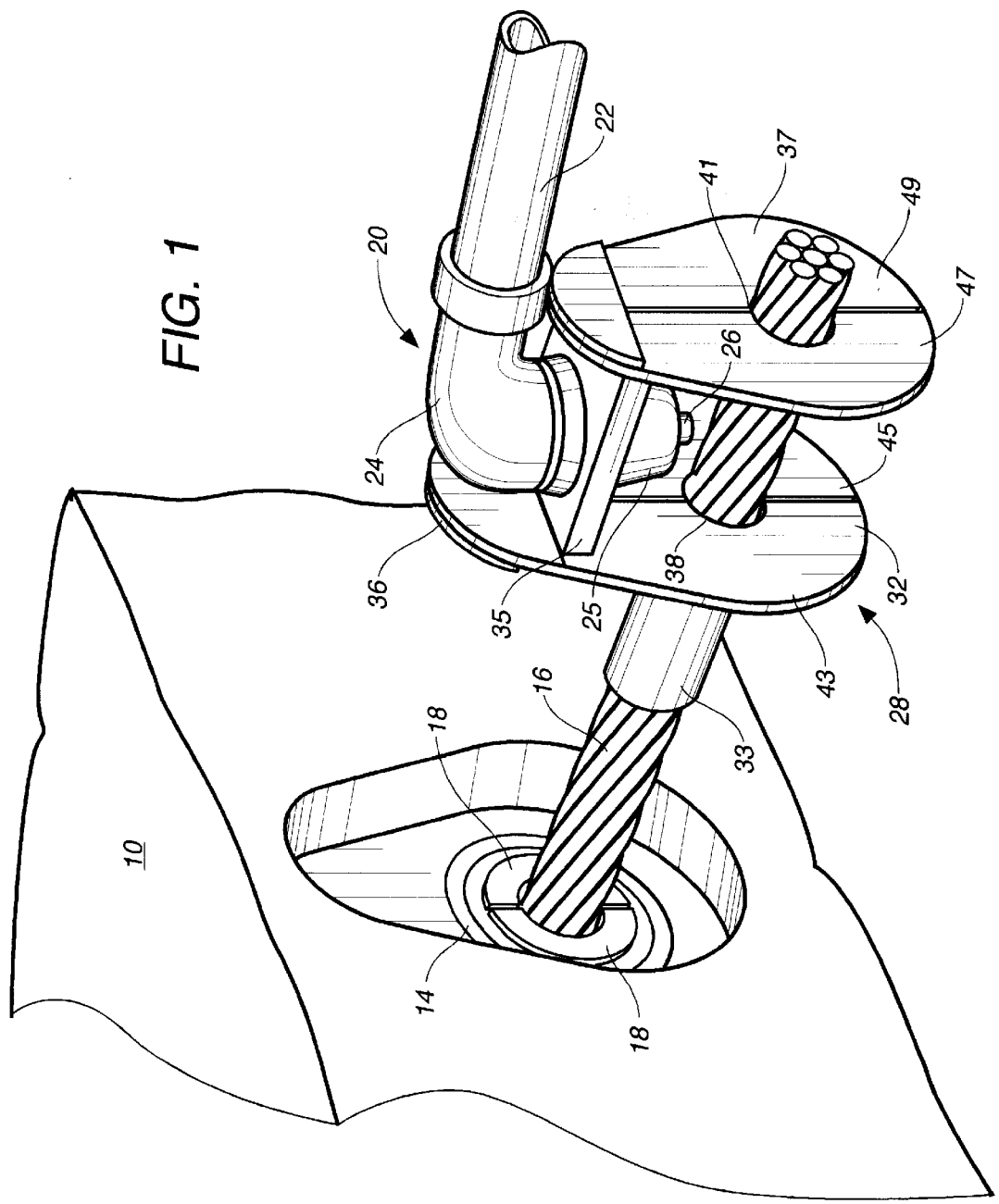
FIG. 1 is a perspective view of a concrete structure with a tendon and anchor recessed therein and illustrating the method and apparatus for using a cutting torch to sever the tendon at a point inboard of the outer edge of the concrete structure.
Figure 2:
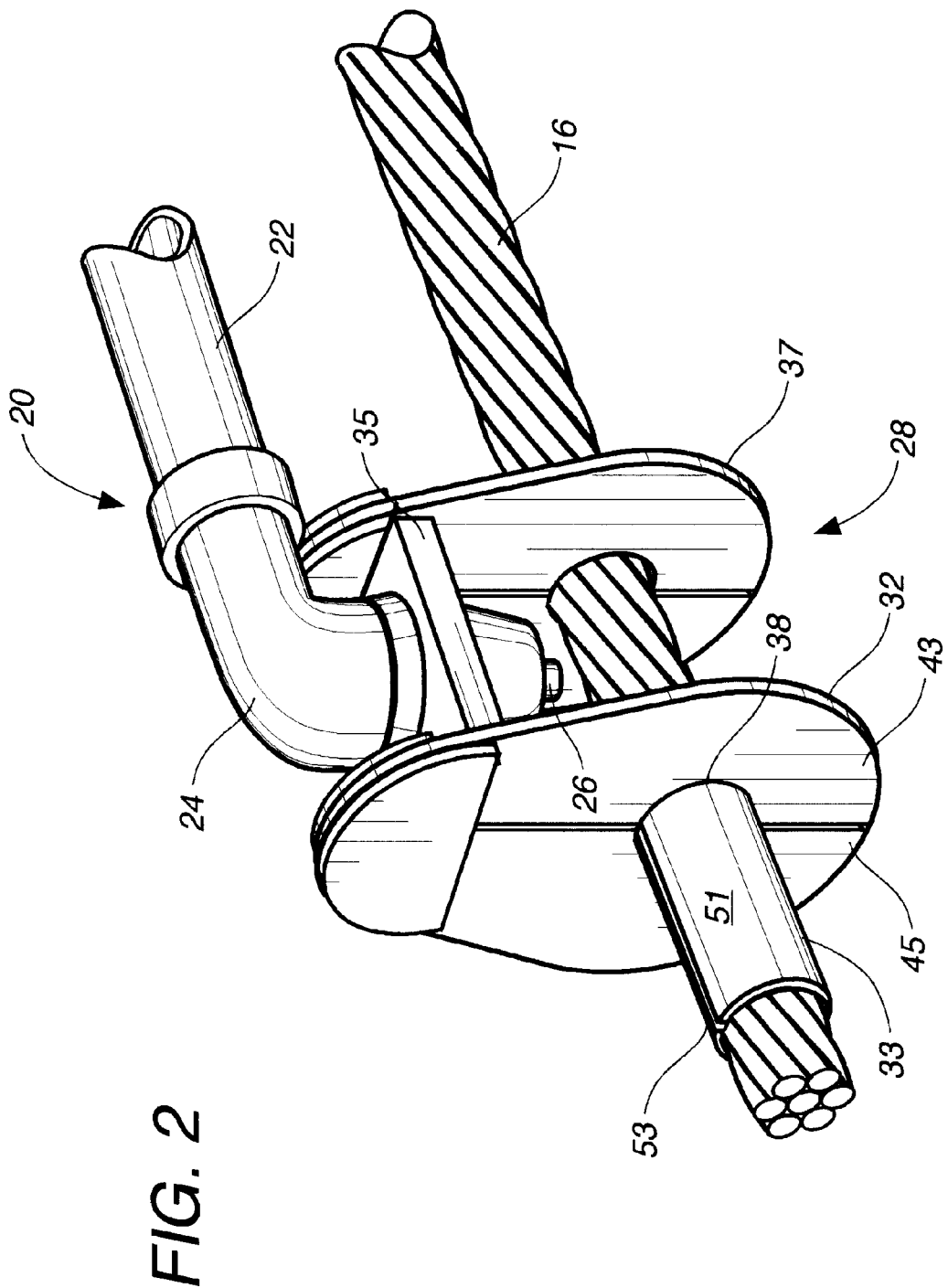
FIG. 2 is a detailed view, in perspective, of the cutting torch head and attachment of FIG. 1 as arranged outwardly of the pocket.

Referring to FIGS. 1 and 2, there is shown a concrete slab or other concrete structure 10. A pocket 12 is formed in the end of the slab 10. A post-tensioning anchor 14 is disposed at the inside face of the pocket. Post-tensioned wire tendon 16 is imbedded in the concrete structure 10. Its free end extends through the anchor and is held in place by wedges 18 seated in the bowl of anchor 14 and gripping the post-tensioned tendon 16 in the usual manner.

In order that the metal anchor 14, wedges 18 and post-tensioned tendon 16 can be protected from the elements, it is desirable to sever the tendon 16 within the depth of the pocket 12, near to the face of the tendon gripping wedges 18. For this purpose, there preferably is provided an acetylene cutting torch 20.

The acetylene cutting torch 20 is a prior art device which utilizes a gas so as to generate a flame at the cutting tip of the acetylene torch 20. The flame will be of a sufficient temperature so as to cut through the tendon 16 in a clean and efficient manner.

The acetylene cutting torch shown includes a handle 22, head 24, and cutting nozzle 26. A ceramic heat shield 25 surrounds a portion of the tip 62.

Since the cutting depth of the acetylene torch is restricted, and since the cutting will be done inside the pocket 12 in close proximity to the anchor 14, means are provided for accurately positioning and shielding the cutting nozzle of the acetylene torch with regard to both the tendon 16 to be cut and the anchor 14.

In the preferred embodiment of the present invention, the positioning and shielding apparatus 28 is releaseably engaged with the tendon 16. The apparatus 10 comprises a first shield 32, a tubular extension 33, a bracket member 35 and a second shield 37. The first shield 32 has a shape which conforms to the shape of the pocket 12 associated with the concrete slab 10. The first shield 32 has opening 38 formed therein. As can be seen, the opening 38 is adapted to allow the tendon 16 to extend therethrough. The tubular extension 33 extends outwardly from the first shield 32 at the opening 38. This tubular extension is adapted to extend around the tendon 16 on one side of the first shield 32. The bracket member 35 is affixed to the first shield 32 and is attached to the cutting torch 20 such that the cutting torch 20 has its cutting nozzle 28 residing on an opposite side of the first shield 32 from the tubular extension 33.

The second shield 37 is connected to the bracket member 35. The second shield 37 has an opening 41 through which the tendon 16 passes therethrough. The second shield 37 is arranged in spaced parallel relationship to the first shield 32 such that the cutting nozzle 26 is interposed between the first shield 32 and the second shield 37.

As can be seen in FIG. 1, the first shield 32 has a first section 43 and a second section 45. The sections are pivotally connected to one another such that the opening 38 is formed on an inner edge of each of the sections 43 and 45. The second shield 37 also includes a first section 47 and a second section 49. The opening 41 is formed in each of the sections 47 and 49. The sections 47 and 49 are pivotable with respect to each other so as to open and close the second shield 37 by gravity action.

FIG. 2 shows a perspective view of the opposite end of the apparatus 28 of the present invention. As can be seen, the first shield 32 has tubular extension 33 extending outwardly therefrom and around the exposed portion of the tendon 16. The tubular extension 33 is illustrated as having a first section 51 and a second section 53. The first section 51 has an end connected to the opening 38 associated with the first shield 32 on first section 43. Similarly, the second semi-tubular section 53 of the tubular extension 33 is affixed to the opening 38 on the second section 45 of the first shield 43. As such, the semi-tubular sections 51 and 53 associated with the tubular extension 33 will open and close with the opening and closing of the sections 43 and 45 of the first shield 32.

In actual use, when the cutting nozzle 26 of the cutting torch 20 imparts a flame onto the surface of the tendon between the first shield 32 and the second shield 37, the first shield 32 will prevent any sparks or other flammable materials from contacting the anchor 14 or its associated wedges 18 by blocking the flight path of such sparks. So as to prevent the migration of heat and flames toward the anchor 14, the tubular extension 33 extends outwardly from the side of the first shield 32 opposite the cutting nozzle 26. By placing sections 51 and 53 in close proximity with the surface of the tendon 16, the igniting of grease formed on the tendon 16 is effectively prevented. The enclosure of this portion of the tendon 16 will reduce the amount of oxygen in the area of the grease on the exterior of tendon 16. As such, flames are prevented. Furthermore, the placement of the sections 51 and 53 in close proximity with the tendon 16 will tend to conduct heat away from the tendon 16 at this area. The rapid diffusion of heat from the tendon 16 will prevent the temperature of the tendon 16 from igniting any grease which resides on the tendon. If necessary, brushes, wipers, or other absorbing materials can be placed on the inner surface of the sections 51 and 53 of tubular extension 33 so as to further prevent the igniting of the grease on the exterior of the tendon 16.

In FIG. 2, it can be seen that the bracket member 35 is secured to the cutting head 24 of the cutting torch 20 so as to properly space the second shield 37 from the first shield 32. It can be seen that the cutting nozzle 26 is placed in close proximity with the outer diameter of the tendon 16 in the area between the shields 32 and 37.

Figure 3:
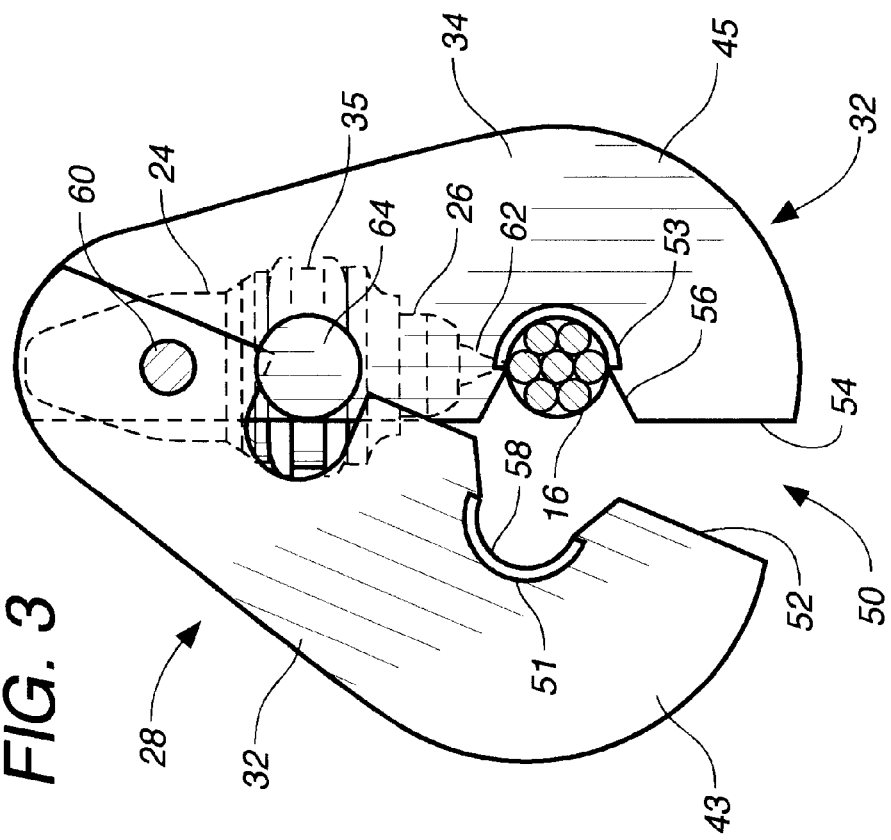
FIG. 3 is a frontal view of the first shield and tubular extension as shown in the open position.

FIG. 3 is an illustrated end view of the apparatus 28 of the present invention. In FIG. 3, for the purposes of illustration, the first shield 32 is illustrated in transparent form so as to illustrate the orientation of the cutting head 24 and the cutting nozzle 26 relative to the tendon 16.

As can be seen in FIG. 3, the first shield 32 is illustrated in its open position. It can be seen that the first shield 32 includes a first section 43 and a second section 45 that are pivotally connected at 60. As such, the sections 43 and 45 can move with respect to each other between a first position (such as that illustrated in FIG. 3) and a second position (such as that illustrated in FIG. 4).

It can be seen in FIG. 3 that the first section 43 has an inner edge 52 extending therealong. A semi-circular indentation 58 is formed along the inner edge 52. The semi-tubular section 51 associated with the tubular extension 33 is affixed at the opening 38 along the semi-circular indentation 58. It can be seen that the inner edge 52 of the first section 43 is suitably angularly spaced from the inner edge 54 associated with the second section 45. The spacing between the inner edges 52 and 54 is sufficient so as to allow the tendon 16 to pass therebetween and into the area defined by the semi-circular indentation 58 of the first section 43 and the semi-circular indentation 56 associated with the second section 45. The semi-tubular section 53 is formed adjacent to the semi-circular indentation 56. It can be seen that this semi-tubular section 53 will reside in close proximity to the outer dianeter of the tendon 16.

The cutting nozzle 26 has a cutting tip 62 extending downwardly so as to be in close proximity to the outer diameter of the tendon 16. The bracket 35 serves to secure the first shield 32 to the cutting head 24 of the cutting torch 20. The bracket 35 is secured at 64 to the first shield 32.

So as to effectively close the first shield 32, gravity will cause the first section 43 to rotate downwardly such that the inner edge 52 will contact or overlap the inner edge 54 such that the semi-circular indentations 58 and 56 will extend around the tendon 16.

Figure 4:
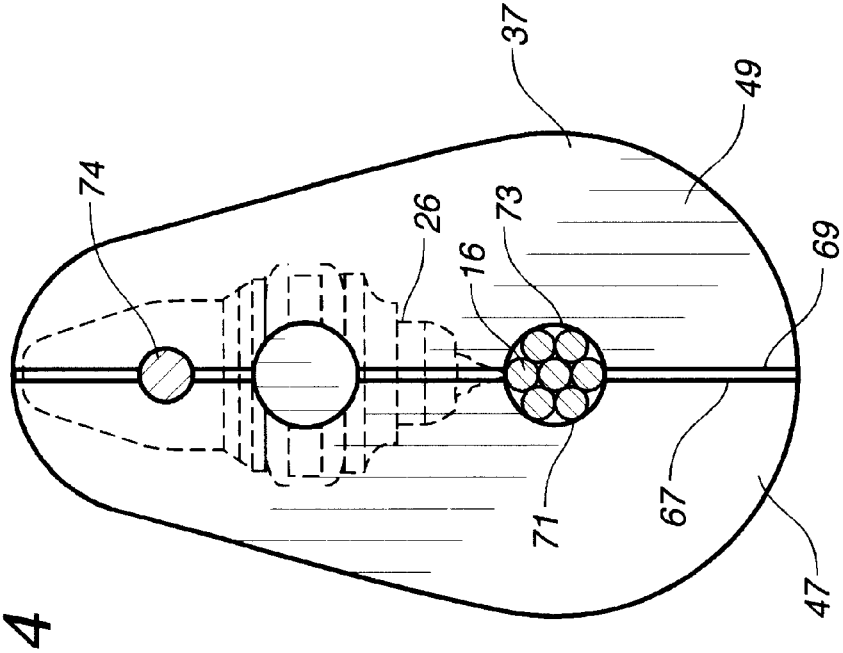
FIG. 4 is a rear view of the second shield as shown in a closed position around the tendon.

FIG. 4 shows how the second shield 37 is arranged, in its closed position, around the tendon 16. In FIG. 4, it can be seen that the second shield 37 includes a first section 47 and a second section 49. The first section 47 has an inner edge 67. The second section 49 has an inner edge 69. A semi-circular indentation 71 is formed along the inner edge 67. Another semi-circular indentation 73 is formed along the inner edge 69. The semi-circular indentations 71 and 73 will be sized so as to extend around the tendon 16. The first section 47 will pivot with respect to the second section 49 from pivot point 74. Various mechanisms can be used so as to establish the suitable pivotal motion between the sections 47 and 49. The sections 47 and 49 can open in the manner described in association with the first shield 32 of FIG. 3. In this arrangement, it can be seen that the cutting nozzle 26 extends downwardly toward the tendon 16. Sparks from the cutting nozzle 26 are effectively prevented from exiting the area of the second shield 37 by the size and shape of the shield 37.

Figure 5:
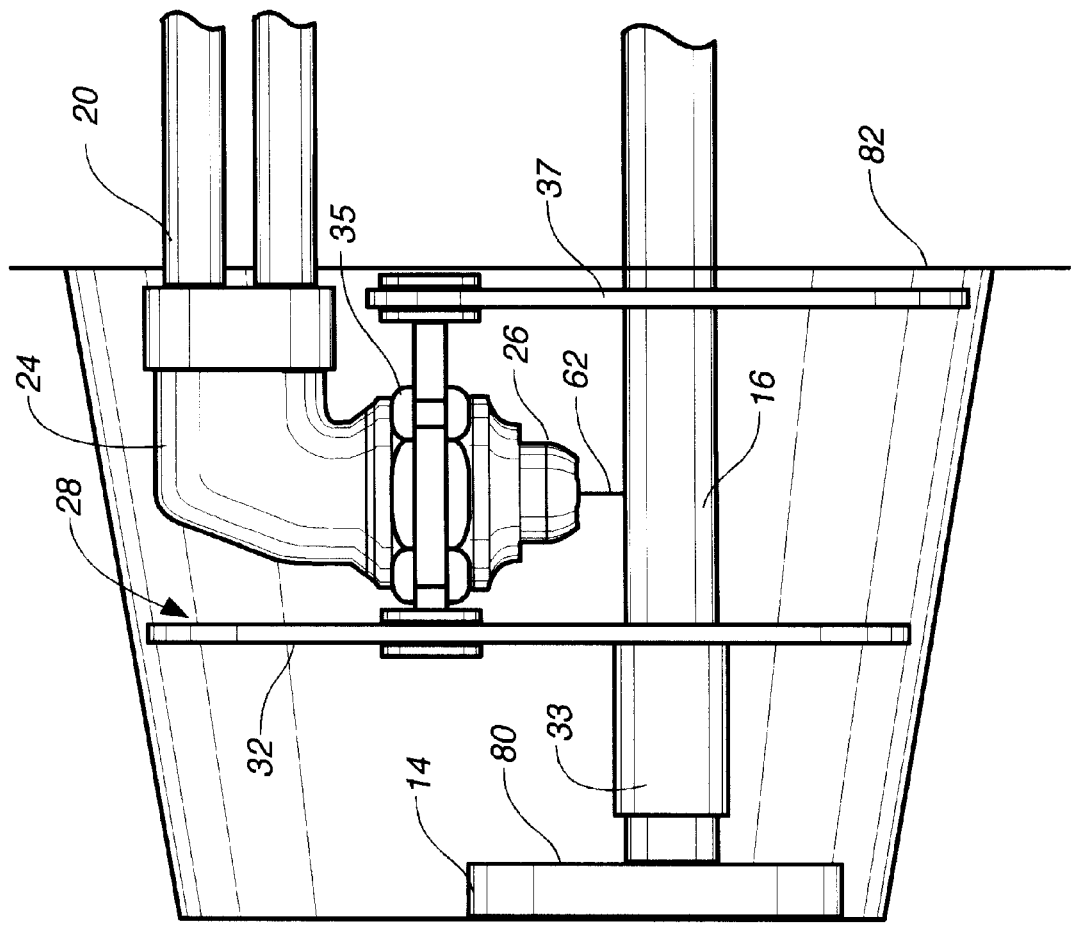
FIG. 5 is a diagrammatic side view of the apparatus of the present invention as attached over the tendon and located within the pocket of the concrete body.

In FIG. 5, the operation of the present invention is illustrated in greater detail. After the tendon 16 has been effectively installed within the anchor member 14, the tendon 16 will extend outwardly from the polymeric encapsulation 80 associated with the anchor 14. Polymeric encapsulation 80 can be the cap-receiving tubular section extending outwardly from the encapsulation surrounding the anchor 14. The encapsulation 80 can also be used so as to receive other devices for the effective sealing of the tendon 16 in its relationship to the anchor 14. The pocket 12 extends outwardly from the anchor 14. Initially, it can be seen that the first shield 32 of apparatus 28 is positioned into the pocket 12 a desired distance. The tubular extension 33 will extend toward the encapsulation 80 associated with anchor 14. Since the tubular extension 33 is in the area between one side of the side of the shield 32 and the anchor 14, the tubular extension 33 will effectively prevent the ignition of any grease on the tendon 16 and will tend to diffuse heat migration which passes from the cutting nozzle 26 associated with the cutting torch 20. The bracket 35 serves to secure the first shield 32 and the second shield 37 to the cutting head 24 of the cutting torch 20. The second shield 37 extends downwardly from the bracket 35 and around the tendon 16. The second shield 37 is positioned generally adjacent to the opening 82 of the pocket 12. The second shield 37 can be suitably sized so as to effectively block any sparks from the cutting torch 20 from passing outwardly of the opening 82 of pocket 12. As such, the second shield 37 will effectively prevent ignition of materials at the construction site and will allow the cutting torches to be used for the severing of the tendon 16. FIG. 5 shows a flame 62 passing outwardly of the cutting nozzle 26 of the cutting torch 20.

By the prevention of heat migration and flames from encountering the are of the polymeric encapsulation 80, the integrity of the encapsulation 80 surrounding the anchor 14 is assured. As such, the present invention will prevent any deformations from occurring to the tubular encapsulation 80 extending outwardly from the anchor 14 and into the pocket 12. The bracket 35 can be adapted so as to be secured on various types of cutting torches. Within the present invention, such cutting torches can include torches such as acetylene torches, oxy-acetylene torches, plasma cutters, and other flame producing cutting devices.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus for attachment to a cutting torch used for severing a tendon used in a post-tension anchor system, the apparatus comprising:

a first shield having an opening formed therein, said opening adapted to allow the tendon to pass therethrough;

a tubular extension extending outwardly of said first shield at said opening, said tubular extension having an interior adapted to extend around the tendon on a side of said first shield; and a bracket member affixed to said first shield and adapted to attach to the cutting torch such that the cutting torch has a nozzle residing on an opposite side of said first shield.

2. The apparatus of claim 1, further comprising:

a second shield connected to said bracket member, said second shield having an opening adapted to allow the tendon to extend therethrough.

3. The apparatus of claim 2, said second shield arranged in parallel spaced relationship to said first shield on said opposite side of said first shield.

4. The apparatus of claim 3, said bracket member adapted to position said second shield on a side of the nozzle of the cutting torch opposite said first shield.

5. The apparatus of claim 1, said first shield comprising:

a first section; and a second section pivotally connected to said first section, said opening formed in both of said first and second sections.

6. The apparatus of claim 5, said first section having an inner edge, said second section having an inner edge, said inner edge of said first section having a semi-circular indentation formed therein, said inner edge of said second section having a semi-circular indentation formed therein, the semi-circular indentations defining said opening in said first shield.

7. The apparatus of claim 6, said first section being movable with respect to said second section between a first position and a second position, said first shield having said inner edges spaced from each other by a distance suitable for allowing the tendon to pass therethrough and into said semi-circular indentations when in said first position, said first shield having said inner edges juxtaposed together such that said semi-circular indentations form said circular opening in said second position.

8. The apparatus of claim 6, said tubular extension comprising;

a first semi-tubular section extending outwardly from said semi-circular indentation of said first section; and a second semi-tubular section extending outwardly from said semi-circular indentation of said second section.

9. The apparatus of claim 7, said first section and said second section being movable with respect to each other by action of gravity.

10. The apparatus of claim 2, said second shield comprising;

a first section; and a second section pivotally connected to said first section, said opening of said second shield being formed in both of said first and second sections of said second shield.

11. The apparatus of claim 10, said first section having an inner edge, said second section having an inner edge, said inner edge of said first section having a semi-circular indentation formed therein, said inner edge of said second section having a semi-circular indentation formed therein, the semi-circular indentations defining said opening in said second shield.

12. An apparatus for attachment to a cuffing torch used for severing a tendon used in post-tension anchor systems, the apparatus comprising:

a first shield having an opening formed therein, said opening adapted to allow the tendon to pass therethrough;

a bracket member affixed to said first shield and adapted to attach to the cutting torch such that the cutting torch resides on one side of said first shield; and a second shield connected to said bracket member, said second shield having an opening adapted to allow the tendon to pass therethrough.

13. The apparatus of claim 12, said second shield arranged in spaced parallel relationship to said first shield on said one side of said first shield, said bracket member adapted to position said second shield on a side of a nozzle of the cutting torch opposite said first shield.

14. The apparatus of claim 12, further comprising:

a tubular extension extending outwardly of said first shield at said opening on a side of said first shield opposite said second shield, said tubular extension having an interior adapted to extend around the tendon.

15. The apparatus of claim 12, each of said first and second shields comprising:

a first section; and a second section pivotally connected to said first section, said opening being formed in both of said first and second sections.

16. An apparatus for severing a tendon used in a post-tension anchor system, the apparatus comprising:

a first shield having an opening formed therein, said opening adapted to allow the tendon to pass therethrough;

a cutting torch having a cutting head and a nozzle;

a bracket member affixed to said first shield and attached to said cutting head of said cutting torch such that said nozzle resides on a side of said first shield; and a tubular extension extending outwardly of said first shield at said opening, said tubular extension having an interior adapted to extend around the tendon on a side of said first shield opposite said cutting head.

17. The apparatus of claim 16, further comprising:

a second shield connected to said bracket member, said second shield having an opening adapted to allow the tendon to extend therethrough, said second shield positioned on an opposite side of said nozzle from said first shield.

18. The apparatus of claim 17, each of said first and second shields being openable and closeable with respect to the tendon so as to allow the tendon to enter the respective openings of said first and second shields.

19. The apparatus of claim 16, said first shield having an edge below said opening which extends below said nozzle of said cutting torch.

* * * * *